Patented Jan. 9, 1923.

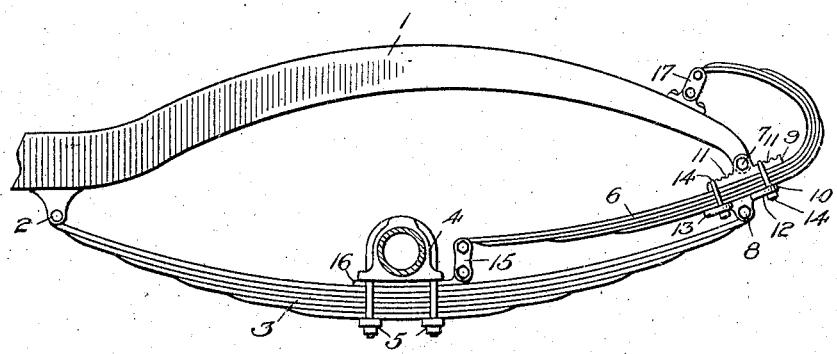
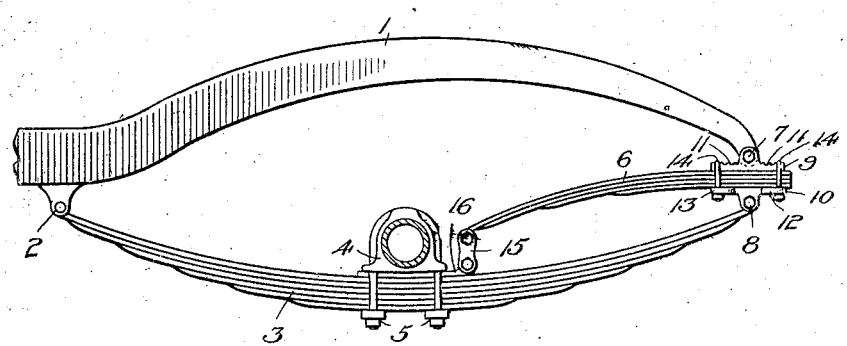
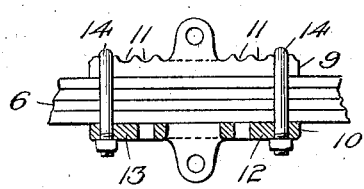

1,441,766

UNITED STATES PATENT OFFICE.

WADE M. WILKES, OF CHARLOTTE, NORTH CAROLINA.

COMPENSATING SPRING HANGER AND SHOCK ABSORBER.

Application filed September 16, 1921. Serial No. 501,024.

*To all whom it may concern:*

Be it known that I, WADE M. WILKES, a citizen of the United States, residing at Charlotte, in the county of Mecklenburg and State of North Carolina, have invented certain new and useful Improvements in Compensating Spring Hangers and Shock Absorbers; and I do hereby declare the following to be a full, clear, and exact description of the invention, such as will enable others skilled in the art to which it appertains to make and use the same.

My invention, broadly stated, relates to automobiles, carriages, wagons and spring vehicles generally, but more particularly to spring equipment of novel construction for use in connection with such vehicles.

It has for an object primarily the production of practical, novel and efficient means for lessening or absorbing the shocks to which vehicles are constantly subjected by reason of road obstructions and inequalities.

It has for a further object the production of novel shock absorbing or compensating leaf-spring suspension mechanism, capable of functioning more flexibly than heretofore, without in the least detracting from, or reducing that degree of rigidity so essential in the present day rapid transit motor vehicles.

For a further object my present system and arrangement of compensating auxiliary springs are designed, arranged and adapted to materially reduce the severe strains and stresses to which the running gear of vehicles, particularly the chassis of motor vehicles including relatively fixed parts and wheels, are constantly subjected while in service, more especially when heavily laden.

With these and other objects and resulting advantages in view, the present invention will be hereinafter particularly described and then pointed out in the appended claims.

In the accompanying drawings which form part of this application for Letters Patent, and whereon corresponding numerals indicate like parts in the several views:

Figure 1 is a side elevation showing one rear spring, and a fragment of a vehicle frame or chassis, together with an auxiliary reciprocating or floating and shock absorbing spring element interposed between said main spring and frame by agency of a rocking hanger;

Figure 2 is also a side elevation similar to Figure 1, and including a modified form of auxiliary shock absorbing spring with its rocking hanger in an adjusted relation; and Figure 3 is a detail detached and relatively enlarged view showing in side elevation partly broken away, the split and adjustable hanger for said auxiliary spring members.

Reference being had to the drawings and characters thereon, 1 indicates the rear end of a supporting frame or chassis of an automobile, the same being of any approved form of construction and material, to which is shackled at 2 in the usual manner, an ordinary leaf spring 3, in the present illustrations being of semi-elliptical shape, and in any event securely and suitably bolted to the axle 4 as indicated at 5.

The numeral 6 indicates an auxiliary, reciprocating, specially arranged and constructed, shock-absorbing or rebound-spring introduced into the rear end suspension substantially as shown, by agency of a novel form of split, adjustable and rocking hanger, pivotally shackled at 7 on one side to the extremity of frame 1, and at 8 upon the opposite side to the rear end of the main spring 3 as shown by Figures 1 and 2. The said hanger comprises upper and lower members 9 and 10 respectively, the former having surface serrations or notches 11, the latter having laterally extending oppositely disposed perforated lugs 12—12 and 13—13, and these members 9 and 10 being adjustably secured together by means of U-bolts 14 passing through said perforations and over the appropriate notches 11 as clearly shown.

The innermost end of the auxiliary spring 6 is first forcibly flexed downwardly and is then pivotally connected under proper tension by agency of a link 15, to a plate or similar fastening 16 rigidly bolted in position beneath axle 4, while in one modified form of the present invention as illustrated by Figure 2, the auxiliary spring element 6 is curled upon itself above its rocker hanger and is pivotally secured by means of an upstanding link 17 to the upper surface of frame or chassis 1 for purposes which will later appear. The form of invention last set forth and illustrated by Figure 2, may be regarded as a modification of that shown by Figure 1 of the drawings, and it should be further understood that my invention is not restricted to the forms of construction herein shown, but may be variously modified and rearranged without departing from the scope of the appended claims, or materially affecting the results accomplished through agency of the organized and systematized arrangement of the parts herein shown and described.

In like manner it is obvious that the present inveniton is equally adapted, or adaptable to front springs as well as rear, and to both front and rear springs if desired.

The construction of my present form and arrangement of compensating auxiliary leverage leaf-spring hanger and shock absorber being substantially as herein shown and described, the operation will now be briefly set forth as follows:

Upon suddenly entering a chuck hole or rut in the road bed, or upon meeting with other road obstructions the wheels of a moving vehicle will be momentarily arrested, and in the absence of suitable spring equipment, or other absorbing mechanism, the shock occasioned thereby is transmitted directly to the vehicle itself and its occupants.

On the other hand with a spring vehicle, such for example as a modern automboile equipped with my improved system of auxiliary shock-absorbing and rebound springs, the shocks occasioned by such sudden and momentary stopping of the wheels (not shown) is in a very large measure absorbed or eliminated primarily by the automatic functioning of the auxiliary spring 6 and its rocking split shackle hanger 9-10, substantially as follows:

Wheel shocks transmitted to axle 4 lift the latter vertically with relation to the heavier vehicle body, thereby straightening the spring 3 more or less according to severity of the shock. Straightening of the main spring 3 advances the rear end thereof by rocking the hanger 9-10 on its shackle 7 as a pivotal center, at the same time reciprocating to a limited degree the auxiliary spring 6, movably secured at its inner end by pivotal link 15. Upon the resulting rebound of spring 3 the action aforesaid is, of course, reversed, and in any event the leverage action set up in the auxiliary spring 6, through the action of main spring 3, and the rocking action of the special supporting hanger 9-10 regulate and controls the rebound effect of the main spring. Moreover, the said auxiliary spring 6 being initially installed under leverage tension has the effect of partially loading the main spring 3, as well as co-acting therewith, particularly upon the rebound, to gradually absorb shocks, reduce wear and tear upon the vehicle, and insure easier, smoother riding.

It sometimes happens that there is a variance in main spring lengths, with reference to that of the vehicle frame, or that auxiliary springs 6 of varying shape are employed in carrying out my improved system. When this occurs, as indicated for example by Figure 2, such variation is compensated for by the adjustment of hanger sections 9-10, and rearrangement of U-bolts 14 in their respective bolt holes 12-13 and notches 11.

In the modification of this inveniton indicated by Figure 2, of the drawings, the auxiliary spring 6 is curled upwardly upon itself and pivotally attached to the upper surface of frame 1 by means of the end link 17, this form of construction insuring a more rigid and positive suspension.

Having now described my invention what I claim and desire to secure by Letters Patent is:

1. In a compensating spring-hanger and shock-absorber for vehicles, the combination with a vehicle frame, main spring and axle, of a floating flexible lever pivotally mounted in a rocking hanger between said frame and main spring, and means for securing the inner end of said lever to the main spring aforesaid.

2. In a compensating spring-hanger and shock absorber for vehicles, the combination with a vehicle frame main spring and axle, of an auxiliary floating spring pivotally mounted in a rocking hanger between said frame and main spring, and means for pivotally connecting one end of said auxiliary spring to the main spring aforesaid at a point intermediate one end of the main spring and the vehicle axle.

3. In a compensating spring-hanger and shock-absorber for vehicles, the combination with a vehicle frame main spring and axle, of an auxiliary floating spring pivotally mounted between said frame and main spring by a rocking hanger, and means for pivotally connecting the inner end of said auxiliary spring to the approximate center of said main spring.

4. In a compensating spring-hanger and shock-absorber for vehicles, the combination with a vehicle frame main spring and axle, of an auxiliary floating spring pivotally mounted between said frame and main spring by a rocking hanger, and a link for pivotally connecting the inner end of said auxiliary spring to the approximate center of said main spring.

5. In a compensating spring-hanger and shock-absorber for vehicles, the combination with a vehicle frame main spring and axle, of an auxiliary floating leaf spring normally under tension supported in a rocking hanger interposed between said frame and main spring, and a link for pivotally connecting inner end of said auxiliary spring to the main spring at its approximate center.

6. In a compensating spring-hanger and shock-absorber for vehicles, the combination with a vehicle frame main spring and axle, of an auxiliary floating spring lever normally under tension mounted at one end in a rocking hanger, between said frame and main spring, and at its opposite end pivotally secured by a link to the main spring at a point adjacent the vehicle axle.

7. In a compensating spring-hanger and shock absorber for vehicles, the combination with a vehicle frame main spring and axle, of an auxiliary leaf spring mounted in a longitudinally adjustable sectional hanger pivotally connected to said frame and main spring, means for retaining said hanger in adjusted positions, and means for securing the opposite end of said auxiliary spring to the main spring.

8. In a compensating spring-hanger and shock absorber for vehicles, the combination with a vehicle frame, main spring and axle, of an auxiliary floating cantilever spring mounted at its base end in an adjustable floating hanger interposed between the main spring and frame of the vehicle, and a link connecting the opposite end of said auxiliary spring to the main spring of the vehicle.

In testimony whereof I affix my signature, in presence of two subscribing witnesses.

WADE M. WILKES.

Witnesses:
C. G. PICKARD,
C. L. SMITH.